United States Patent
Roderwald et al.

(10) Patent No.: US 11,453,500 B2
(45) Date of Patent: Sep. 27, 2022

(54) LIFE VEST DEVICE

(71) Applicant: RECARO Aircraft Seating GmbH & Co. KG, Schwaebisch Hall (DE)

(72) Inventors: Martin Roderwald, Fort Worth, TX (US); Daniel Jung, Schwaebisch Hall (DE); Michael Streckert, Schwaebisch Hall (DE); Thomas Schuler, Schwaebisch Hall (DE); Klaus Steinmeyer, Rosengarten (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 395 days.

(21) Appl. No.: 16/598,084

(22) Filed: Oct. 10, 2019

(65) Prior Publication Data

US 2021/0107658 A1    Apr. 15, 2021

(51) Int. Cl.
*B64D 11/06* (2006.01)
*B63C 9/23* (2006.01)
*B63C 9/08* (2006.01)

(52) U.S. Cl.
CPC ............ *B64D 11/0631* (2014.12); *B63C 9/23* (2013.01); *B63C 9/08* (2013.01)

(58) Field of Classification Search
CPC .......... B63C 9/08; B63C 9/23; B64D 11/0631
See application file for complete search history.

(56) References Cited

U.S. PATENT DOCUMENTS

| | | | | |
|---|---|---|---|---|
| 11,124,278 B2* | 9/2021 | Aruga | ..................... | B63C 9/22 |
| 2003/0215162 A1* | 11/2003 | Switlik | .................... | B63C 9/23 383/59 |
| 2007/0232164 A1* | 10/2007 | Swan | ................. | B64D 11/0631 441/108 |
| 2007/0266782 A1* | 11/2007 | Bartz | ................... | G06Q 10/087 73/156 |
| 2009/0242695 A1* | 10/2009 | Lamoree | ................ | B64D 25/00 244/1 R |
| 2015/0038030 A1* | 2/2015 | White | .................... | B64D 25/00 441/88 |
| 2019/0016462 A1* | 1/2019 | White | ................ | B64D 11/0631 |
| 2019/0057598 A1* | 2/2019 | Martinez-Barreiro | ...................... | G08B 26/008 |
| 2019/0225341 A1* | 7/2019 | Flinn | .................. | B64D 11/0631 |

FOREIGN PATENT DOCUMENTS

| | | | | |
|---|---|---|---|---|
| DE | 102012004154 A1 | * | 9/2013 | ............. A45C 13/10 |
| GB | 2519180 A | * | 4/2015 | ............. B64D 11/00 |
| GB | 2583451 A | * | 11/2020 | ............... B63C 9/23 |
| WO | WO-2016120643 A1 | * | 8/2016 | ............... B63C 9/23 |

* cited by examiner

*Primary Examiner* — Richard G Davis
(74) *Attorney, Agent, or Firm* — Posz Law Group, PLC

(57) ABSTRACT

A life vest device, for a fixation on one or more aircraft seats, with a life vest unit, which is embodied as a lift vest with a packaging unit for a sealed accommodation of the life vest unit and with an opening unit for an opening of the packaging unit, which features one or more pull straps. The opening unit is functionally connected with the life vest unit and the packaging unit comprises one or more fixation units for a fixation on an aircraft seat. For a retrieval of the life vest unit from the packaging unit, the opening unit is connected in a tear-proof manner with the life vest unit. The pull strap and the life vest are embodied integrally with each other.

Figure 1:
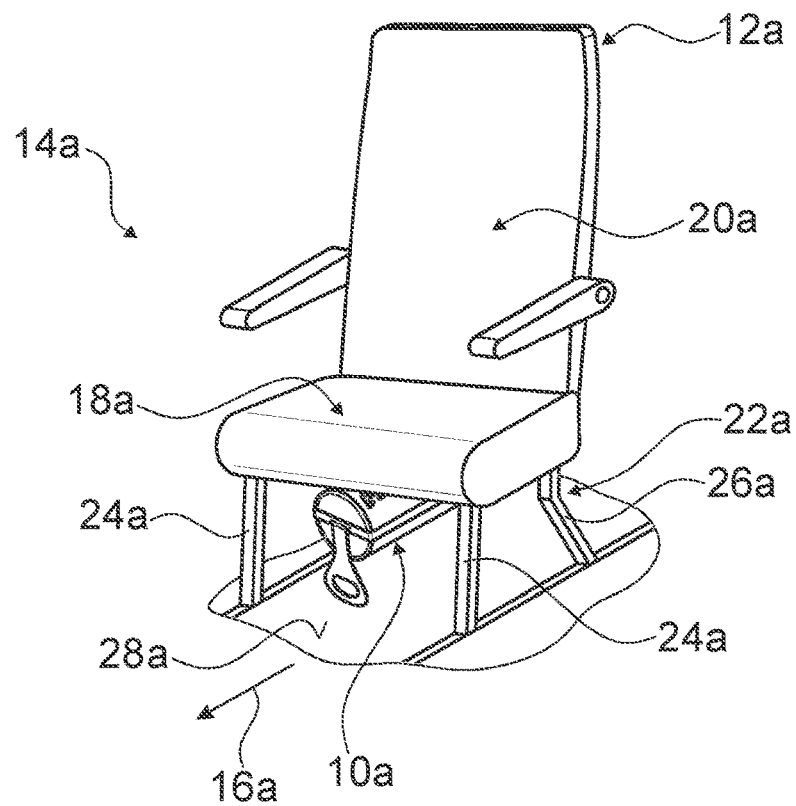

18 Claims, 8 Drawing Sheets

LIFE VEST DEVICE

PRIOR ART

The invention relates to a life vest device according to the preamble of patent claim 1.

A life vest device with at least one life vest unit, with at least one packaging unit for an accommodation of the at least one life vest unit and with at least one opening unit for an opening of the at least one packaging unit, has already been proposed.

The objective of the invention is, in particular, to provide a life vest device with improved properties regarding a simple replacement and regarding a safe and rapid handling. According to the invention, the objective is achieved by the features of patent claim 1, while advantageous embodiments and developments of the invention may be gathered from the dependent claims.

SUMMARY OF THE INVENTION

The invention relates to a life vest device, in particular for a fixation on at least one aircraft seat, with at least one life vest unit, with at least one packaging unit for an, in particular sealed, accommodation of the at least one life vest unit and with at least one opening unit for an opening of the at least one packaging unit.

It is proposed that the at least one opening unit is functionally connected with the at least one life vest unit and that the at least one packaging unit comprises at least one fixation unit for a fixation on an aircraft seat. By means of the invention, improved properties regarding a simple replacement and regarding a safe and rapid handling can be achieved. By means of the invention, a simple and secure packaging of the life vest device can be achieved. Moreover, the invention allows that no separate sealing of the life vest unit, e.g. by means of a pouch or a box, is required. An advantageously simple replacement of the life vest device is achieved by the invention. An operational reliability of an aircraft can be advantageously increased, since an operation of the aircraft, especially in meeting a defined departure slot, remains unaffected in a fast and simple replacement of the life vest device, since the whole life vest device is replaceable all at once. The invention allows dispensing with an additional sealing of the life vest unit, in particular by certified staff, directly at the aircraft seat, whereby the life vest device can be replaced by cabin crew staff, for instance. Thus, a replacement time of the life vest device can be saved advantageously. Further, the invention allows providing an advantageous life vest device with a low demand for space. Additionally, potentially low fabrication and installation costs can be achieved.

Preferentially, the aircraft seat comprises at least one seat bottom unit, at least one backrest unit and at least one mounting unit. Preferably, the at least one seat bottom unit and the at least one backrest unit are arranged at the at least one mounting unit. Preferentially, the aircraft seat is mounted in an aircraft cabin of an aircraft. Preferentially, the aircraft cabin comprises a cabin floor on which the at least one aircraft seat is mounted by means of the mounting unit. Preferably, the at least one fixation unit is configured for a fixation of the life vest device on the at least one aircraft seat. Preferentially, the at least one fixation unit is configured to fix the at least one packaging unit on the aircraft seat. Preferably, the at least one fixation unit is configured for a fixation of the life vest device at the at least one mounting unit of the at least one aircraft seat. Advantageously, in a mounted state, the life vest device is arranged between the cabin floor and the at least one seat bottom unit. Advantageously, the life vest device is arranged hanging underneath the at least one seat bottom unit by means of the at least one fixation unit. In principle, it is conceivable that the life vest device is arranged in another region of the aircraft seat, which, in particular, is easily accessible by a passenger.

Preferably, the at least one life vest unit is embodied as a life jacket. Preferentially, the at least one life vest unit is provided for an emergency situation, in which there is a danger of drowning. Advantageously, the at least one life vest unit is configured to be worn by a person, in particular by a passenger or by a crew member, in the emergency situation. Preferably, the at least one life vest unit is embodied inflatable. The term "configured" is in particular to mean specifically designed and/or equipped. An object being configured for a certain function is in particular to mean that the object implements and/or carries out said certain function in at least one application state and/or operation state. Preferentially, the at least one life vest unit features at least one gas cartridge, which is configured for inflating the life vest unit upon activation.

Preferably, the at least one packaging unit is embodied as a sealed packaging unit. Preferentially, the at least one packaging unit comprises at least one storage chamber for an accommodation of the at least one life vest unit. Advantageously, the at least one life vest unit is, in a mounted state, arranged in the at least one storage chamber. Preferably, the at least one packaging unit features at least one packaging element. Preferentially, the at least one packaging element encompasses the at least one storage chamber. Preferably, the at least one packaging element is configured for housing the life vest unit inside the at least one storage chamber. Preferentially, the at least one packaging element is embodied as an, in particular flexible, bag. Alternatively, it is conceivable that the at least one packaging element is embodied as an, in particular rigid, container. "Flexible" is in particular to mean a material property of the at least one packaging element, which has a low modulus of elasticity and a low extensional stiffness, wherein a high degree of deformation of the at least one packaging element is caused by a small force and/or by a small torsional load applied to the at least one packaging element. Preferentially, in an unmounted state, the at least one packaging element is configured to be rollable on itself, in particular without causing a plastic deformation of a material of the at least one packaging element. Preferably, the at least one packaging element is made of a plastic material or of a technical textile, which is in particular embodied as a foil. Additionally, it is conceivable that the at least one packaging element features a mesh, which is configured for reinforcing the at least one packaging element. Preferentially, the mesh is incorporated into the at least one packaging element. Advantageously, the at least one packaging element is embodied at least partially transparent. Preferably, a material thickness of the at least one packaging element is at least substantially constant. A material thickness which is "at least substantially constant" is in particular to mean that a deviation of a first value of the material thickness from a second value of the material thickness is in particular smaller than 25%, preferably smaller than 10% and advantageously smaller than 5% of the second value. Preferentially, the material thickness of the at least one packaging element is at least 1 mm. Preferentially, the material thickness of the at least one packaging element is in particular at most 3 mm, preferably at most 2 mm and advantageously at most 1 mm. Preferably, the at least one packaging unit is sealed. In this context the term "sealed" is in particular to mean that the at least one packaging unit can merely be opened by destruction of at least one sealing part, in particular the at least one packaging element. Preferentially, the at least one packaging unit cannot be opened nondestructively. In this context the term "sealed accommodation" is in particular to mean that the life vest device is kept safe inside the at least one packaging unit, wherein a manipulation of the at least one life vest device is impossible without damaging the at least one packaging unit. Preferably, the at least one packaging unit is configured to be evacuated from contained air to create a vacuum in the at least one storage chamber. Preferentially, the at least one life vest unit is packed inside the at least one packaging unit in a vacuum. Advantageously, the at least one packaging unit is configured to fit its form around the at least one life vest unit, in particular in the vacuum.

Preferentially, the at least one aircraft seat comprises a seating direction. In this context the term "seating direction" is in particular to mean a direction which is aligned at least substantially parallel to the cabin floor, in particular at a deviation of maximum 3 degrees from the cabin floor, and at least substantially perpendicular to the theoretical, planar backrest unit aligned perpendicular to the cabin floor, wherein the direction corresponds to a normal on a front side of the backrest unit, wherein the front side of the backrest unit forms a support surface for a back of a passenger in an ordinary sitting position. Preferably, the at least one life vest unit can be uncased from the at least one packaging unit by means of the at least one opening unit. In this context the term "functionally connected" is in particular to mean that a bond between the at least one packaging unit and the at least one opening unit is configured for a specific function, in particular for a retrieval of the at least one life vest unit due to an actuation of the at least one opening unit. Preferably, the at least one opening unit features at least one pull strap. Preferentially, the at least one pull strap is configured for an actuation of the at least one opening unit in a direction at least substantially parallel to the seating direction. In this context the term "at least substantially parallel" is in particular to mean that an angle to the seating direction is in particular less than 30 degrees, preferably less than 20 degrees and advantageously less than 10 degrees.

In another embodiment of the invention it is proposed that for a retrieval of the at least one life vest unit from the at least one packaging unit, the at least one opening unit is connected, in particular connected in an at least substantially tear-proof manner, with the at least one life vest unit. As a result, a passenger can get the life vest unit by means of one hand movement. Therefore, no fumbling under the seat bottom unit is necessary to take the life vest unit out of the at least one packaging unit. As a result, in an evacuation situation, loose parts, in particular the at least one opening unit, laying on the cabin floor can be advantageously avoided. As a result, a tripping hazard can be avoided advantageously. In this context the term "retrieval" is in particular to mean that the at least one life vest unit is removed by a person, in particular by a passenger, from the at least one packaging unit, in particular in an emergency situation. Preferentially, the at least one opening unit and the at least one life vest unit are embodied integrally. Advantageously, the at least one pull strap and the at least one life vest unit are embodied integrally. Preferably, the at least one pull strap is connected with the at least one life vest unit by a substance-to-substance bond, by a positive fit bond and/or by a force closure bond. In this context the term "at least substantially tear-proof manner" is in particular to mean that a tensile-strength value of the material of the at least one opening unit, in particular of the at least one pull strap, is higher than a tensile force, which can be applied to the life vest device by a passenger by hand, wherein a connection between the at least one opening unit and the at least one life vest unit can be detached partially. Preferably, the tensile force which is applied to the at least one opening unit and which is necessary to open the at least one packaging unit is at least 100 N. Additionally or alternatively, it is conceivable that the at least one opening unit is embodied removable from the at least one life vest unit, in particular by hand, after an actuation of the at least one opening unit.

In a preferred embodiment of the invention it is proposed that the at least one opening unit is actuatable for a retrieval of the at least one life vest unit from the at least one packaging unit at least substantially simultaneously with the opening of the at least one packaging unit. As a result, improved properties regarding a safe and rapid handling can be achieved. As a result, an at least substantially uninterrupted tensile force can be exerted on the life vest device by the passenger during removal of the at least one life vest unit. Moreover, no sudden interruption of the tensile force is noticeable to the passenger pulling the at least one opening unit. As a result, an accidental release of the at least one opening unit from the hand can be advantageously avoided. In this context the term "actuatable" is in particular to mean that a person, in particular the passenger, can pull on the at least one opening unit, in particular the at least one pull strap, wherein the at least one opening unit destroys the at least one packaging unit to retrieve the at least one life vest unit, wherein the at least one packaging unit is configured for a sealed accommodation of the at least one life vest unit. In this context the term "at least substantially simultaneously" is in particular to mean that the actuation of the at least one opening unit and the opening of the at least one packaging unit happens in particular within 2 seconds, preferably within 1 second and advantageously within 0.5 seconds, wherein the actuation of the at least one opening unit happens first. Preferably, by actuation of the at least one opening unit, the at least one packaging unit is configured to be partially torn. Preferably, the at least one life vest device is retrievable from the at least one storage chamber as the at least one opening unit is actuated and the at least one packaging unit is opened.

In a further embodiment of the invention it is proposed that a connection of the at least one opening unit with the at least one life vest unit has a higher tensile-strength value than a connection of the at least one opening unit with the at least one packaging unit. As a result, at least one defined braking point can be provided. As a result, a defined opening of the at least one packaging unit can be achieved, wherein the at least one life vest unit is provided to be pulled out of the defined opening. As a result, improved properties regarding a safe handling can be achieved. Preferably, a tensile-strength value of the connection of the at least one opening unit with the at least one life vest unit is in particular at least 10%, preferably at least 20% and advantageously at least 50% higher than a tensile-strength value of the connection of the at least one opening unit with the at least one packaging unit. Advantageously, the connection of the at least one opening unit with the at least one packaging unit is configured to fail before the connection of the at least one opening unit with the at least one life vest unit on an actuation of the at least one opening unit.

In an alternative embodiment of the invention it is proposed that the at least one opening unit is configured to seal the at least one packaging unit in an at least section-wise manner in a non-actuated state. As a result, the at least one opening unit serves as well as a seal and as an opening means for the at least one packaging element. Moreover, by this combination, an advantageously lightweight life vest device can be provided. Preferentially, in the non-actuated state, the at least one life vest unit is arranged inside of the at least one packaging unit. Preferably, the at least one packaging unit is sealed in the non-actuated state. Preferentially, the at least one packaging element is configured to be airtight. Advantageously, in the non-actuated state, the at least one life vest unit is packed airtight inside the at least one packaging unit, in particular inside the at least one packaging element.

In another embodiment of the invention it is proposed that, in the non-actuated state, for the purpose of establishing the connection to the at least one life vest unit, the at least one opening unit extends in an at least section-wise manner in an inner space of the at least one packaging unit. As a result, the at least one life vest unit can be advantageously removed from the at least one packaging unit by means of the at least one opening unit. Preferably, the at least one opening unit extends in an at least section-wise manner in an inner space of the at least one packaging unit, in particular in the at least one storage chamber, in the non-actuated state to define a connection to the at least one life vest unit. Preferentially, the inner space of the at least one packaging unit is embodied as the at least one storage chamber. Preferably, the at least one opening unit is coupled with the at least one life vest unit. Preferentially, the at least one opening unit is not configured for activating the at least one life vest unit, in particular not for an inflation of the at least one life vest unit. Preferably, the at least one life vest unit features at least one activation element, which is configured for inflating the at least one life vest unit. Preferably, the at least one activation element is embodied different than the at least one opening unit, in particular the at least one pull strap.

In a preferred embodiment of the invention it is proposed that the at least one opening unit is at least partially embodied as an opening tab that is, in an at least section-wise manner, connected with the at least one packaging unit and with the at least one life vest unit by substance-to-substance bond, in particular welded or glued on the at least one packaging unit and on the at least one life vest unit. Alternatively or additionally, it is conceivable that the opening tab is, in an at least section-wise manner, connected with the at least one packaging unit and with the at least one life vest unit by a positive-fit connection, in particular stitched on the at least one packaging unit and/or on the at least one life vest unit. As a result, only one hand movement is required by the passenger to retrieve the at least one life vest unit. As a result, improved properties regarding a safe and rapid handling can be achieved. Preferably, the at least one opening unit comprises the opening tab. In this context the term "opening tab" is in particular to mean a means that is implemented as a handle, as a rip-off element on a surface of the at least one packaging unit and as a link to the at least one life vest unit. Preferentially, the opening tab is connected with the at least one packaging unit and with the at least one life vest unit in an at least section-wise manner. Preferably, the at least one opening unit encompasses the at least one packaging unit in the non-actuated state at least section-wise U-shaped, in particular horseshoe-like, O-shaped and/or L-shaped. Preferably, the at least one opening unit is configured to overlap the at least one packaging unit at least partially. In principle, it is conceivable that the at least one opening unit is configured to be placed at least partially inside the at least one storage chamber, in particular on an inner surface of the at least one packaging element. Preferentially, the at least one opening unit features at least one opening strip. Advantageously, the at least one opening strip is configured to overlap the at least one packaging element at least partially. Preferably, in the non-actuated state, the at least one opening strip is arranged on the at least one packaging element, in particular on an outer surface of the at least one packaging element. Preferably, the at least one opening strip is connected with the at least one pull strap. Advantageously, the at least one opening strip is connected with the at least one pull strap by a substance-to-substance bond, by a positive fit bond and/or by a force closure bond. Preferably, the at least one opening strip and the at least one pull strap are embodied integrally. Advantageously, the at least one opening strip and/or the at least one pull strap are/is made of a plastic material, in particular a foil. Preferentially, the at least one opening strip and the at least one pull strap are made of a same material. Preferably, a material thickness of the at least one opening strip and/or the at least one pull strap is at least substantially constant. Preferentially, the material thickness of the at least one opening strip and/or the at least one pull strap is in particular at least 0.2 mm, preferably at least 0.5 mm and advantageously at least 1 mm. Preferentially, the material thickness of the at least one opening strip and/or the at least one pull strap is around 1 mm to 2 mm. Preferably, the at least one opening strip is functionally connected with the at least one packaging element. Advantageously, the at least one packaging element comprises at least one predetermined breaking point. Preferably, the at least one predetermined breaking point is arranged adjacently to the at least one opening strip. Preferentially, by actuation, the at least one opening strip is configured for ripping the at least one packaging element open in at least one spot, in particular in the at least one predetermined breaking point. Advantageously, the at least one opening strip is configured for ripping the at least one packaging element open in a section-wise manner, in particular along at least one elongate section. Preferentially, the at least one elongate section comprises a maximum extent of in particular at least 30%, preferably at least 50% and advantageously at least 70% of a maximum extent of the at least one life vest unit. Preferably, by an actuation of the at least one opening unit, the at least one opening unit, in particular the at least one opening strip, is configured to tear the at least one packaging unit, in particular the at least one packaging element, open along the connection of the at least one opening unit with the at least one packaging unit.

In a further embodiment of the invention it is proposed that the at least one opening unit is configured, upon actuation, to irreversibly destroy a sealing of the at least one packaging unit. As a result, a manipulated life vest device can be visually identified in an advantageous fast way. As a result, an availability of a safety-critical life vest device, which in particular is in accordance with safety rules, can advantageously be ensured. Advantageously, the at least one opening unit is configured, upon actuation, to irreversibly destroy a seal of the at least one packaging unit. Preferentially, the sealed accommodation of the at least one life vest unit is opened upon actuation, in particular opened to the aircraft cabin. Advantageously, a resealing of the at least one packaging unit after an actuation of the at least one opening unit is impossible by hand, in particular without at least one tool. Preferably, subsequently to an actuation of the at least one opening unit the at least one packaging unit comprises at least one tear. Preferentially, the at least one tear is configured to separate the at least one packaging unit and the at least one opening unit from each other. Advantageously, the at least one tear is configured for a retrieval of the at least one life vest unit out of the at least one storage chamber.

In an alternative embodiment of the invention it is proposed that the at least one life vest device comprises at least one marking unit, which is configured to indicate an opened state of the at least one packaging unit. As a result, improved properties regarding a safe handling can be achieved. As a result, a life vest device, which has been manipulated and is no more in accordance with safety rules, can be identified in an advantageously quick and simple way. Preferentially, the life vest device is at least partially unsealed in the opened state. Preferentially, the at least one marking unit is configured to indicate a difference between a sealed state, in particular the non-actuated state, of the life vest device and the opened state visually and/or acoustically. Preferably, the at least one opening unit is partially embodied as the at least one marking unit. It is conceivable that the at least one marking unit is configured to change a color of the at least one opening unit and/or the at least one packaging unit by a chemical reaction, in particular due to an opening of the sealed accommodation or subsequently to an at least partial tear-off of the at least one opening unit. Additionally or alternatively, it is conceivable that the at least one marking unit is configured to spread a defined smell, in particular due to an opening of the sealed accommodation or subsequently to an at least partial tear-off of the at least one opening unit.

In another embodiment of the invention it is proposed that the at least one marking unit is configured at least partially as a tear-off section of the at least one packaging unit, wherein the at least one opening unit is configured, subsequent to actuation, to separate the tear-off section from a remaining portion of the packaging unit to indicate an opened state of the at least one packaging unit. As a result, a life vest device, which has been manipulated and is no more in accordance with safety rules, can be identified in an advantageously quick and simple way by visual inspection. As a result, improved properties regarding a fast identification of a faulty life vest device and a safe handling can be achieved. Preferentially, the tear-off section is embodied as a part of the at least one packaging element. Preferably, by an actuation of the at least one opening unit, the tear-off section is implemented to be taken out of the packaging element. Preferentially, the tear-off section is connected to the at least one opening strip subsequently to an actuation of the at least one opening unit. Preferably, the tear-off section has at least substantially a same surface area as the at least one opening strip in a torn-off area, where the tear-off section and the at least one opening strip are arranged overlapping. In this context the term "at least substantially" is in particular to mean that a deviation from a predetermined value is in particular less than 25%, preferably less than 10% and advantageously less than 5% of the predetermined value. Advantageously, by an actuation of the at least one opening unit the at least one opening unit is separated from the at least one packaging unit. Preferably, by an actuation of the at least one opening unit the at least one packaging element is at least partially separated from one another.

In a preferred embodiment of the invention it is proposed that the at least one fixation unit comprises at least one fixation element that is arranged on the at least one packaging unit, in particular welded or glued or stitched on the at least one packaging unit and is configured for a stationary fixation of the at least one packaging unit, in particular on the at least one aircraft seat. As a result, improved properties regarding a simple attachment of the life vest device on the at least one aircraft seat can be achieved. As a result, a simple and quick replacement of the life vest device can be ensured. Advantageously, the at least one fixation unit is at least configured to prevent a substantial movement of the at least one packaging unit in the seating direction. In this context the term "substantial movement" is in particular to mean that a horizontal movement of the at least one packaging unit during an actuation of the at least one opening unit is in particular maximum 10 cm, preferably maximum 5 cm and advantageously maximum 2 cm. Preferably, the at least one fixation unit comprises at least one connection element. Preferentially, the at least one connection element is configured to tie the at least one fixation element to the at least one aircraft seat. Preferentially, the at least one connection element is embodied as a sling. Advantageously, the at least one connection element is implemented as an, in particular double sided, hook and loop fastener. Alternatively, it is conceivable that the at least one connection element is embodied as a cable tie or as a rope. Preferably, the at least one fixation element features a loop. Advantageously, the loop is configured to hold the at least one connection element, in particular on the at least one packaging unit. Additionally or alternatively, it is conceivable that the at least one connection element is embodied integrally with the at least one fixation element.

In an alternative embodiment of the invention it is proposed that the at least one life vest device comprises at least one monitoring device, which is at least configured to capture a change of at least one characteristic by at least one electric and/or electronic signal. As a result, a simple safety check of the life vest device can be provided. Advantageously, a safety check of the life vest device can be done location-independent and time-independent. Moreover, as a result, an advantageously quick safety check of the life vest device, in particular of a plurality of life vest devices according to the invention, can be performed. As a result, a reduced work-load for a cabin crew or security staff or technical staff, who has to regularly check the life vest device, in particular before a departure of the aircraft, can be achieved. Preferentially the monitoring device is at least configured to capture, via the at least one electric and/or electronic signal, a manipulation of the packaging unit and/or a removal of the life vest unit out of the packaging unit. The term "electric signal" is in particular to mean a signal that is embodied as an electric energy. The term "electronic signal" is in particular to mean a signal that is configured for data communication. The term "manipulation" is in particular to mean that a condition of the at least one packaging unit is changed subsequently to an, in particular intentional, contact of a person, in particular of a passenger, with the at least one packaging unit. For instance, the at least one packaging unit may be damaged due to the manipulation. Preferably, the monitoring device is at least configured to monitor the life vest unit with regard to conformity with the at least one characteristic, in particular during an operation of the aircraft. Advantageously, the at least one characteristic comprises at least one state, in particular of the life vest device. Preferentially, the at least one state has at least one state value. Preferably, the at least one state value is realized as "0" or "1", or as "false" or "true". Preferentially, the at least one characteristic has one predetermined state value. In this context the term "predetermined state value" is in particular to mean a value that fulfills at least one requirement of a certification regulation for an operation of the life vest device, in particular of the at least one packaging unit. In this context the term "change of at least one characteristic" is in particular to mean a change of the at least one state, wherein in particular the at least one state value deviates from a previous state value and/or from the predetermined state value. Preferably, as a result of a manipulation, the at least one characteristic, in particular the at least one state, is changed. Preferentially, as a result of the removal of the life vest unit out of the at least one packaging unit, the at least one characteristic, in particular the at least one state, is changed.

Preferentially, the at least one monitoring device comprises at least one control and/or regulation unit. Advantageously, the at least one control and/or regulation unit is configured to capture the at least one electric and/or electronic signal and to send at least one output signal to a checking system. Preferably, the checking system is configured for receiving the at least one output signal for data interpretation and/or for presentation of a monitoring result. As a result, an advantageously automated data processing can be provided. As a result, a fully automated safety check of the life vest container device can be advantageously realized. The term "control and/or regulation unit" is in particular to mean a unit having at least one control electronics member. The term "control electronics member" is in particular to mean a unit with a processor unit and with a memory unit and with an operating program stored in the memory unit. Preferentially, the processor unit is configured for processing the at least one electric and/or electronic signal. It is conceivable that the at least one control and/or regulation unit is also configured as part of an inflight entertainment module and/or as part of an aircraft seat adjustment module. Preferably, the at least one control and/or regulation unit is configured to determine whether there is a change of the at least one characteristic, in particular a change of the at least one state. Preferentially, the output signal comprises at least one dataset, which features information about the at least one characteristic, in particular about the at least one state. The term "checking system" is in particular to mean a system which is configured for receiving the output signal, for data interpretation and/or for presentation of a monitoring result. Preferentially, the monitoring result is embodied as an outcome of an automated safety check of the life vest device. Preferably, the at least one monitoring device comprises at least one electric and/or electronic sensor unit. Advantageously, the at least one electric and/or electronic sensor unit is at least partly arranged on the at least one packaging unit and/or inside the at least one packaging unit. Preferentially, the at least one electric and/or electronic sensor unit features at least one detection element, which is configured to create and/or to modify the at least one electric and/or electronic signal. Preferably, the at least one electric and/or electronic sensor unit is at least configured for detecting a manipulation of the at least one packaging unit and/or of the at least one opening unit and/or for detecting a presence of the at least one life vest unit inside the at least one storage chamber.

The invention further relates to a system with at least one life vest device according to the present invention and with at least one aircraft seat, wherein the at least one life vest device is fixable and/or fixated on the at least one aircraft seat in a stationary manner. As a result, improved properties regarding a simple replacement of the life vest device and regarding a safe and rapid handling of the life vest device can be achieved. Preferentially, the at least one life vest device is configured to be attached permanent to the at least one aircraft seat. Preferably, the at least one life vest device is fixed on the at least one aircraft seat in stationary manner. Advantageously, the at least one aircraft seat is embodied as an economy-class seat, which is in particular free of a leg rest. Preferably, the at least one life vest device is configured to be retrofitted to the at least one aircraft seat.

The invention further relates to a method for a production of a life vest device according to the present invention. As a result, an advantageous life vest device with improved properties regarding a simple replacement and regarding a safe and rapid handling can be provided. Preferentially, in a first method step, the at least one life vest unit gets connected with the at least one opening unit. Preferably, in a second method step, the at least one life vest unit gets inserted into the at least one packaging unit, wherein the at least one packaging element is opened. Advantageously, in a third method step, the at least one opening unit gets at least partially arranged on the at least one packaging unit, wherein the at least one opening strip is connected, in particular welded or glued or stitched, on the at least one packaging element. Preferably, in a fourth method step, the life vest device is proofed regarding a zero-defect sealing. It is conceivable that the method can also contain intermediate method steps and/or further method steps which are not part of the invention.

It is not intended to restrict the life vest device, the system and the method according to the invention to the use and embodiment described above. The content of this disclosure is intended to contain all conceivable combinations of the features mentioned herein. In particular, the life vest device, the system and the method according to the invention can have a number of individual elements, components and units different from that mentioned herein in order to perform a function described herein. Furthermore, regarding the value ranges mentioned in this disclosure, values within the limits mentioned are to be understood to be also disclosed and to be used as applicable.

DRAWINGS

Further advantages may become apparent from the following description of the drawings. In the drawings four exemplary embodiments of the invention are shown. The drawings, the description and the claims contain a plurality of features in combination. The person having ordinary skill in the art will purposefully also consider the features separately and will find further expedient combinations.

If there is more than one specimen of a certain object, at least in some cases only one of these is given a reference numeral in the figures and the description. The description of this specimen may be correspondingly transferred to the other specimens of the object.

Figure 2:
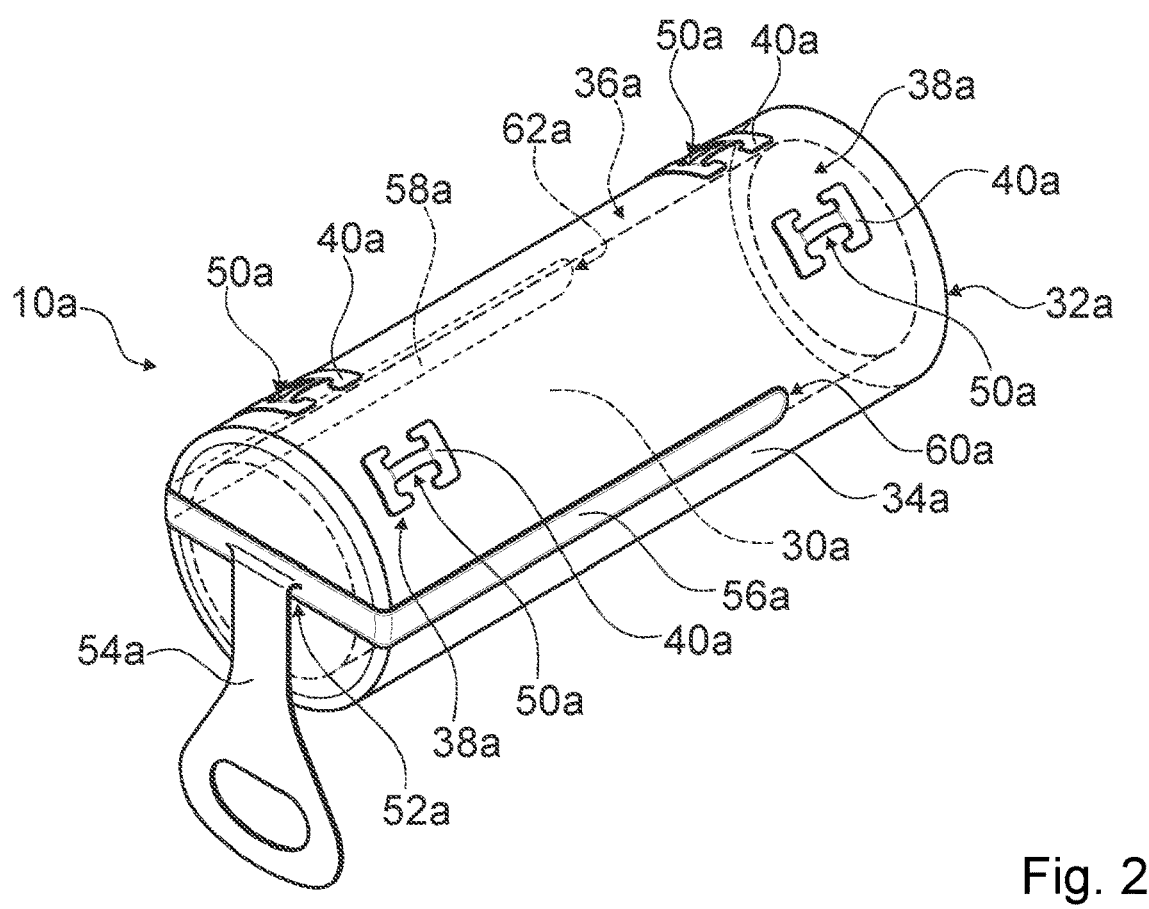
Figure 3:
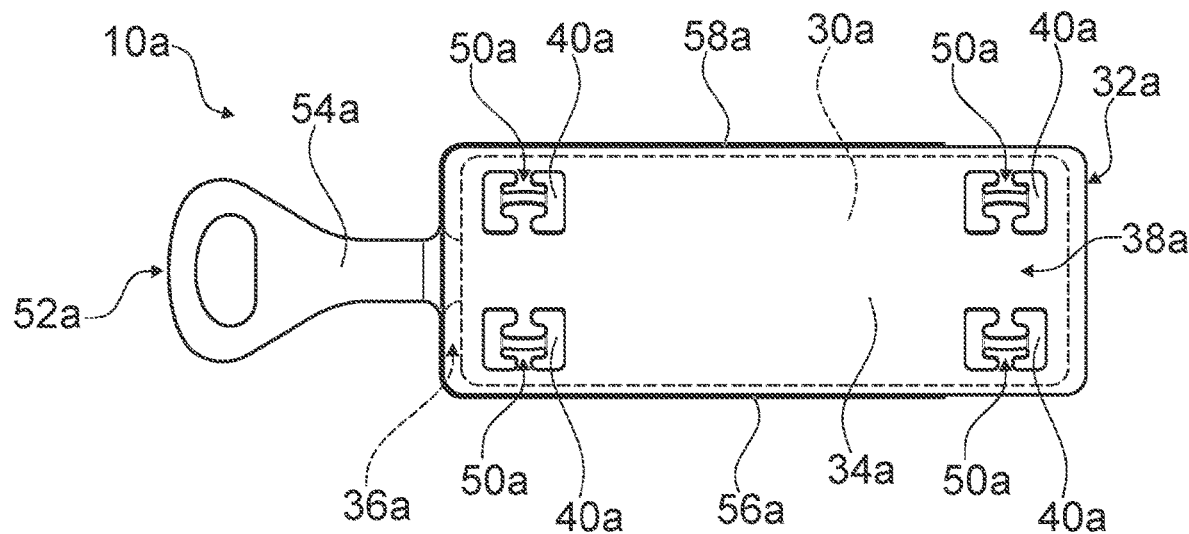
Figure 4:
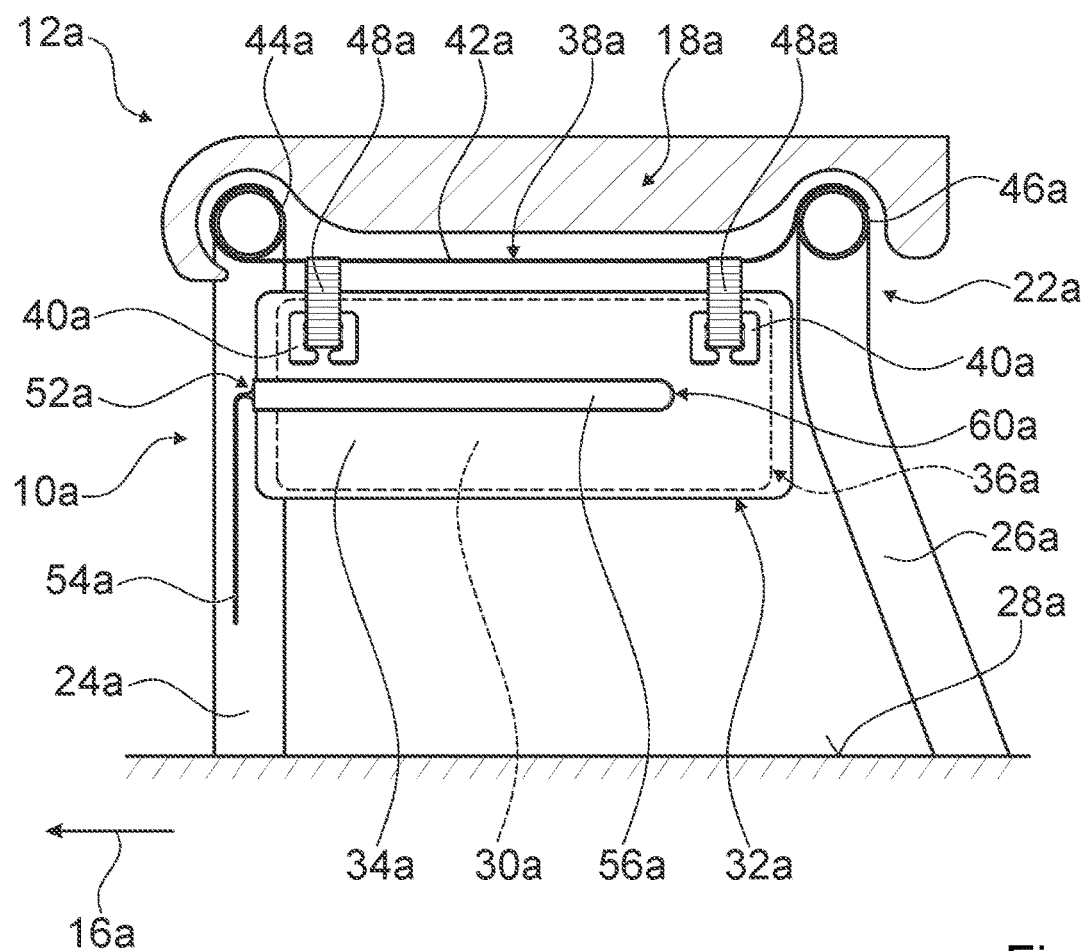
Figure 5:
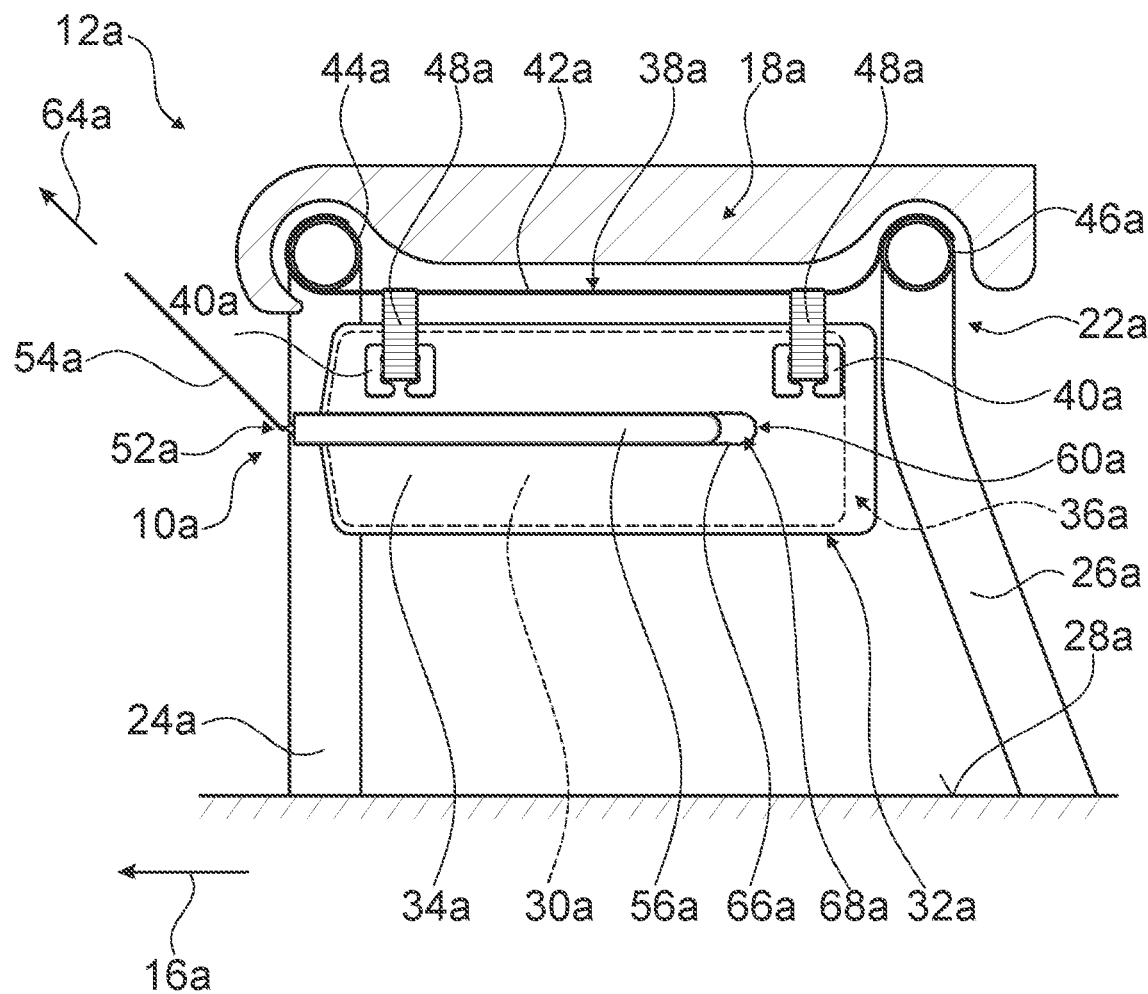
Figure 6:
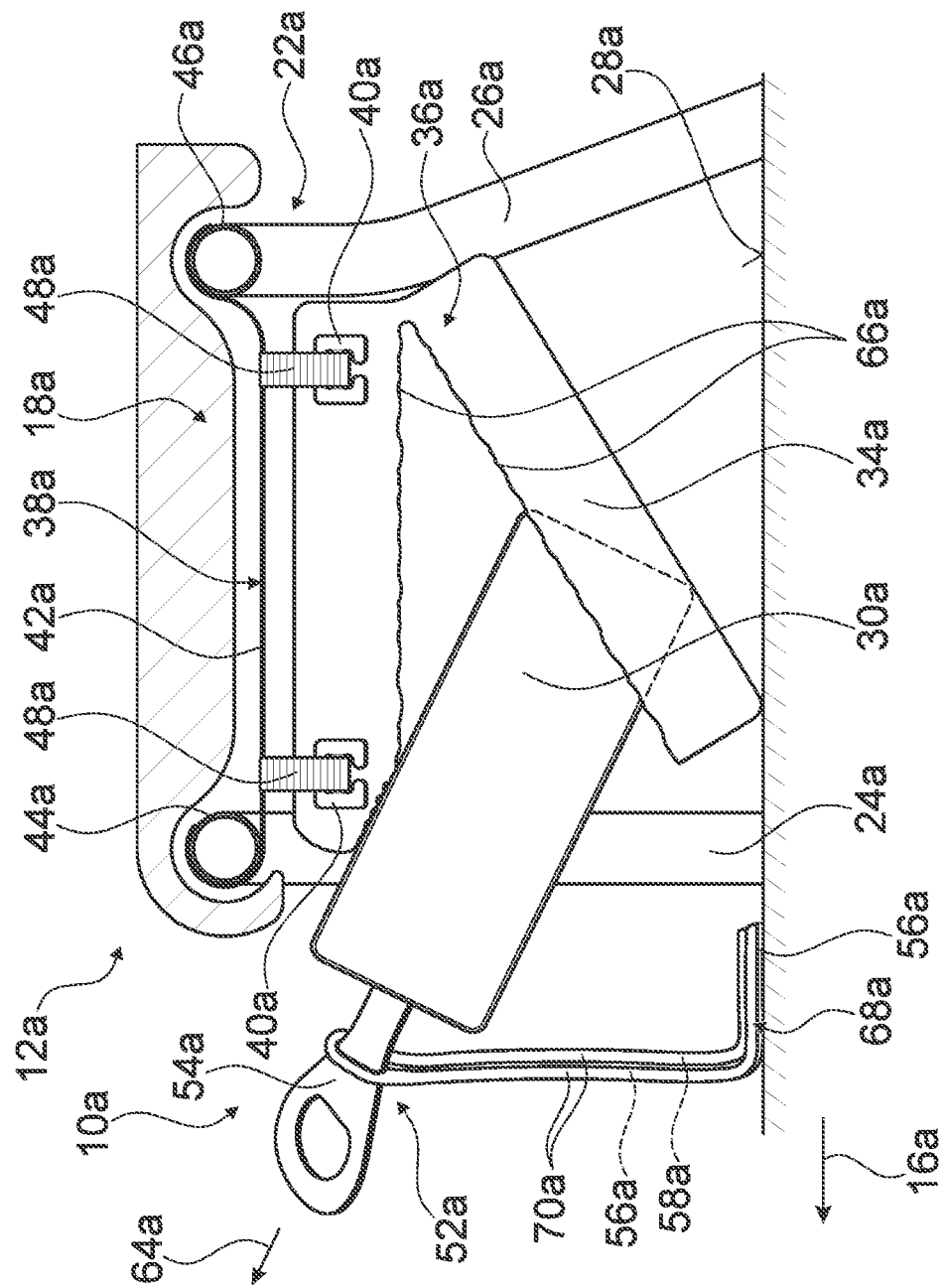
Figure 7:
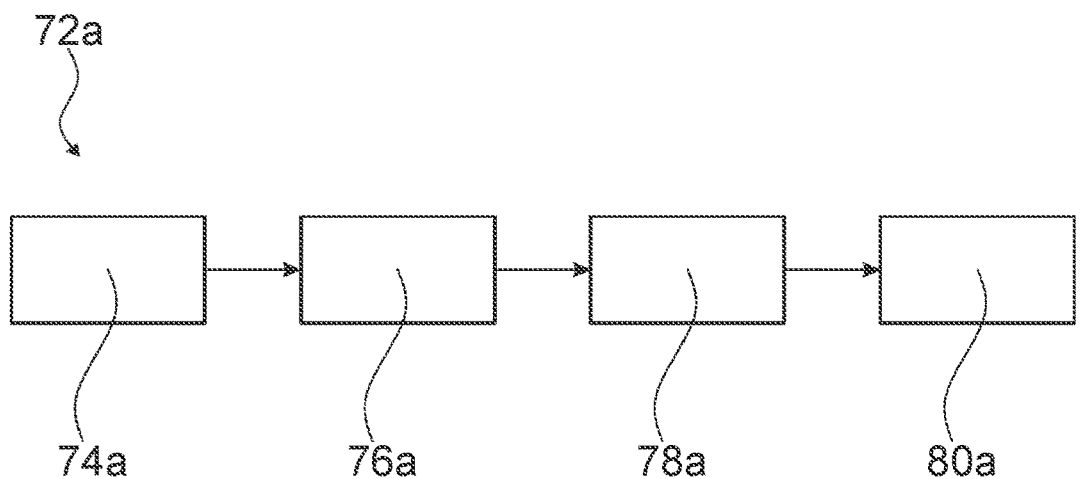
Figure 8:
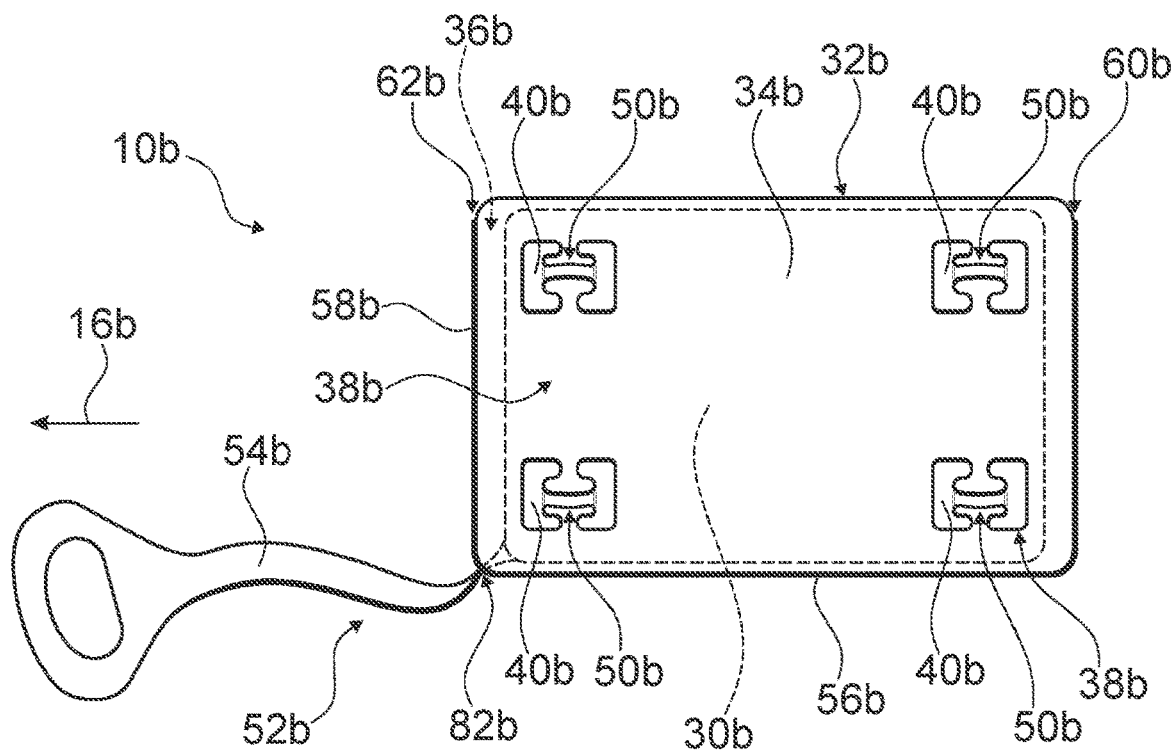
Figure 9:
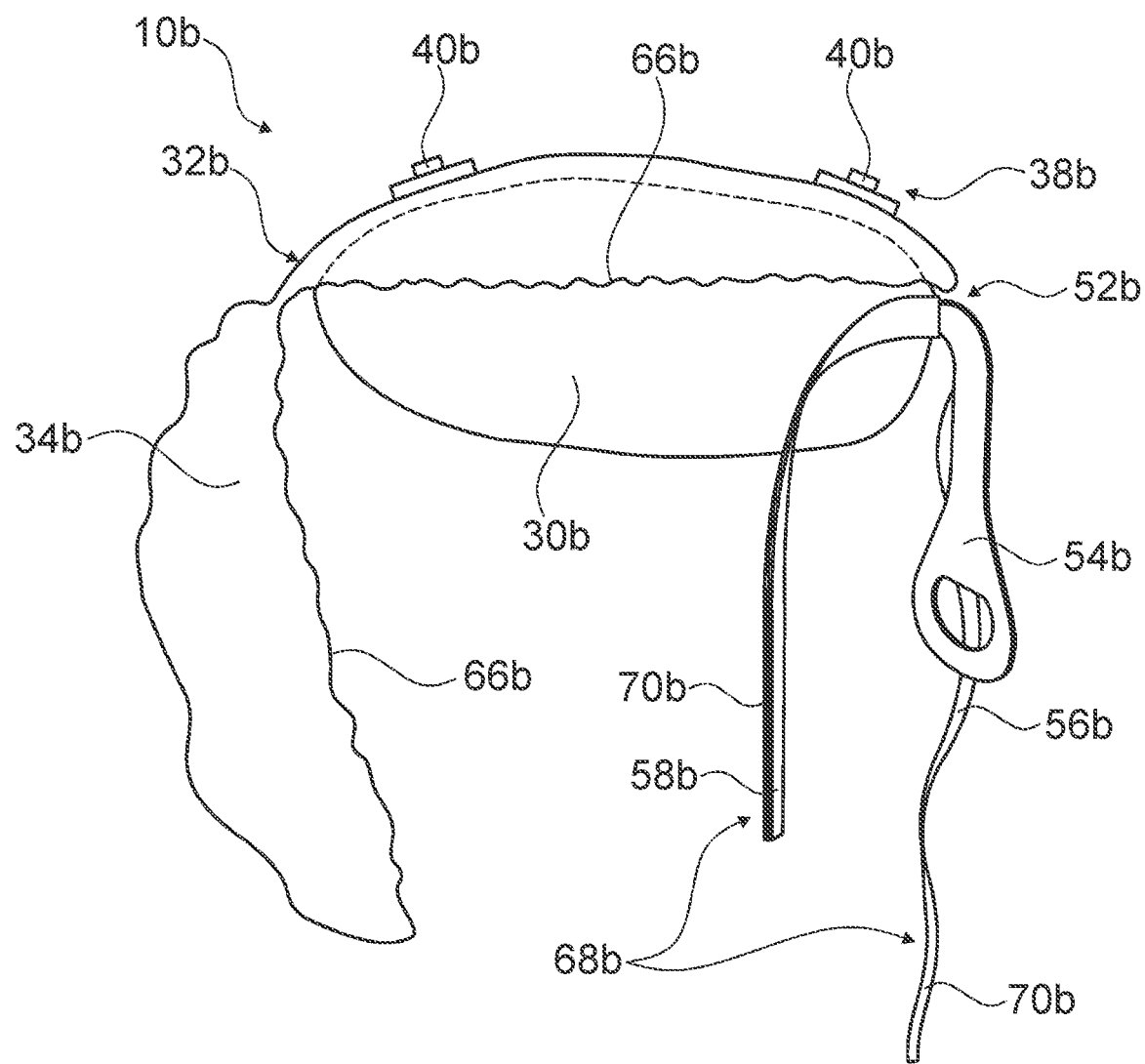
Figure 10:
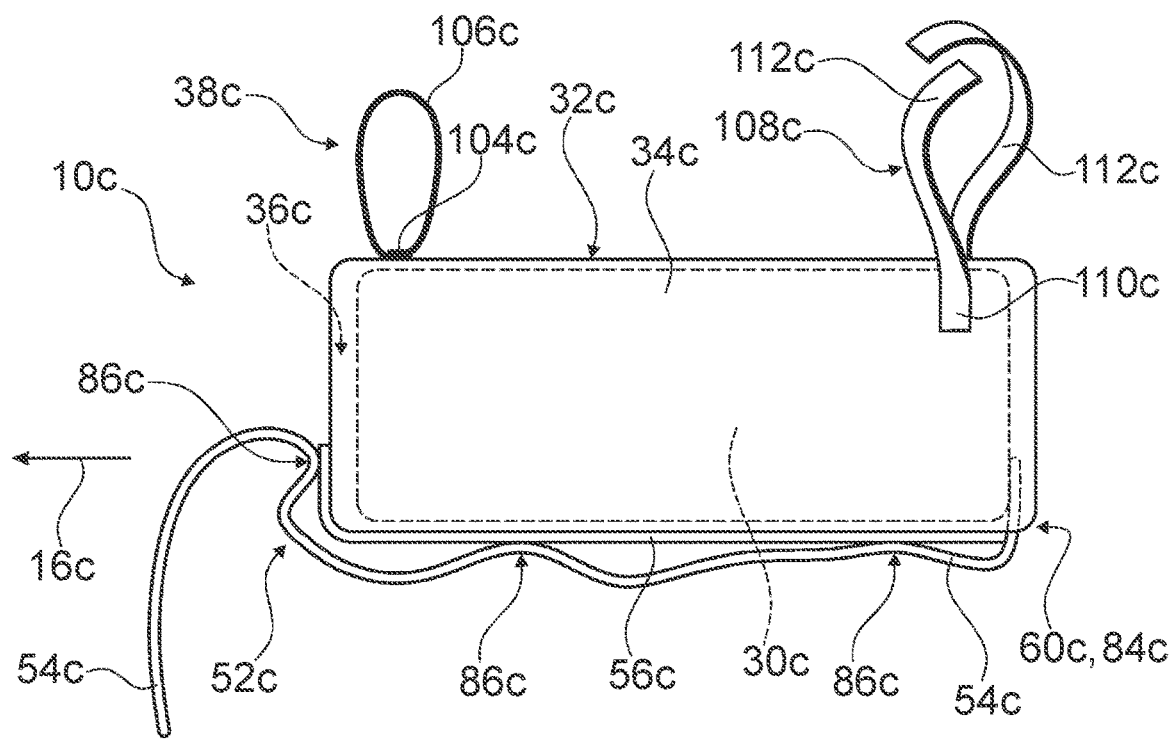
Figure 11:
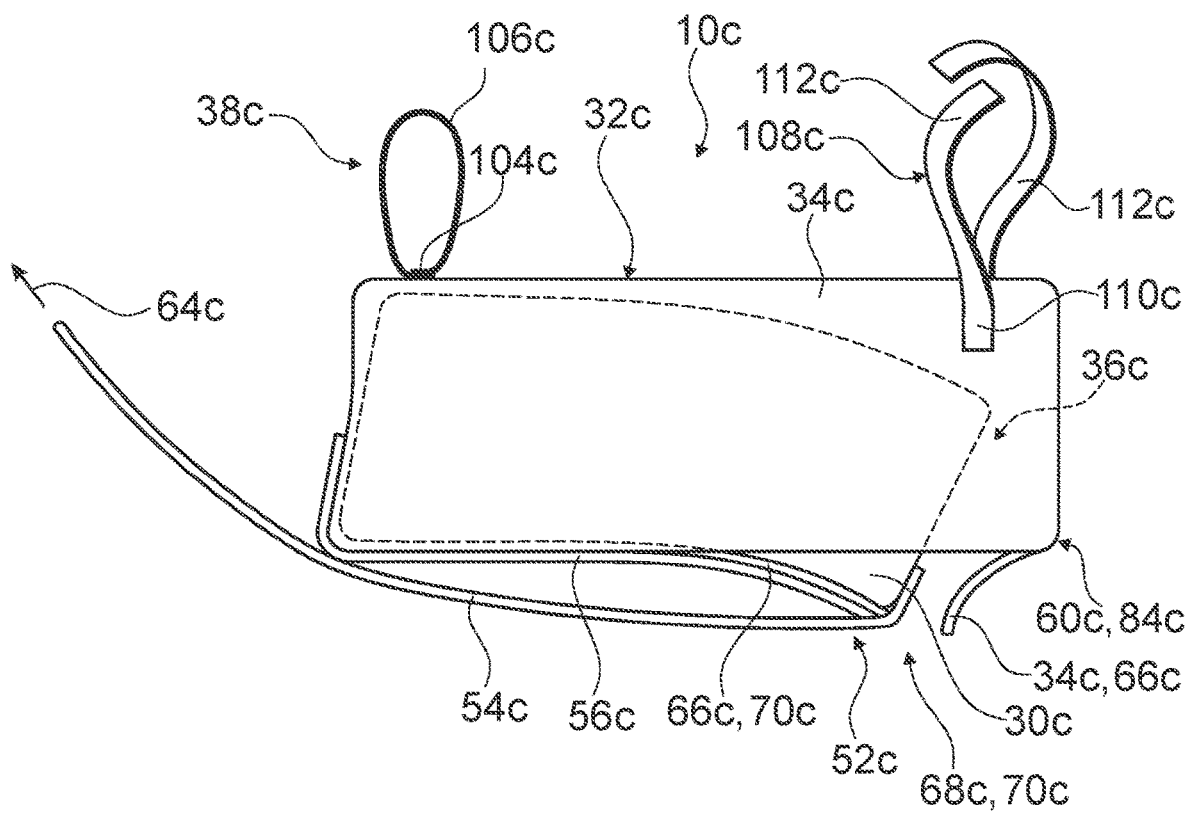
Figure 12:
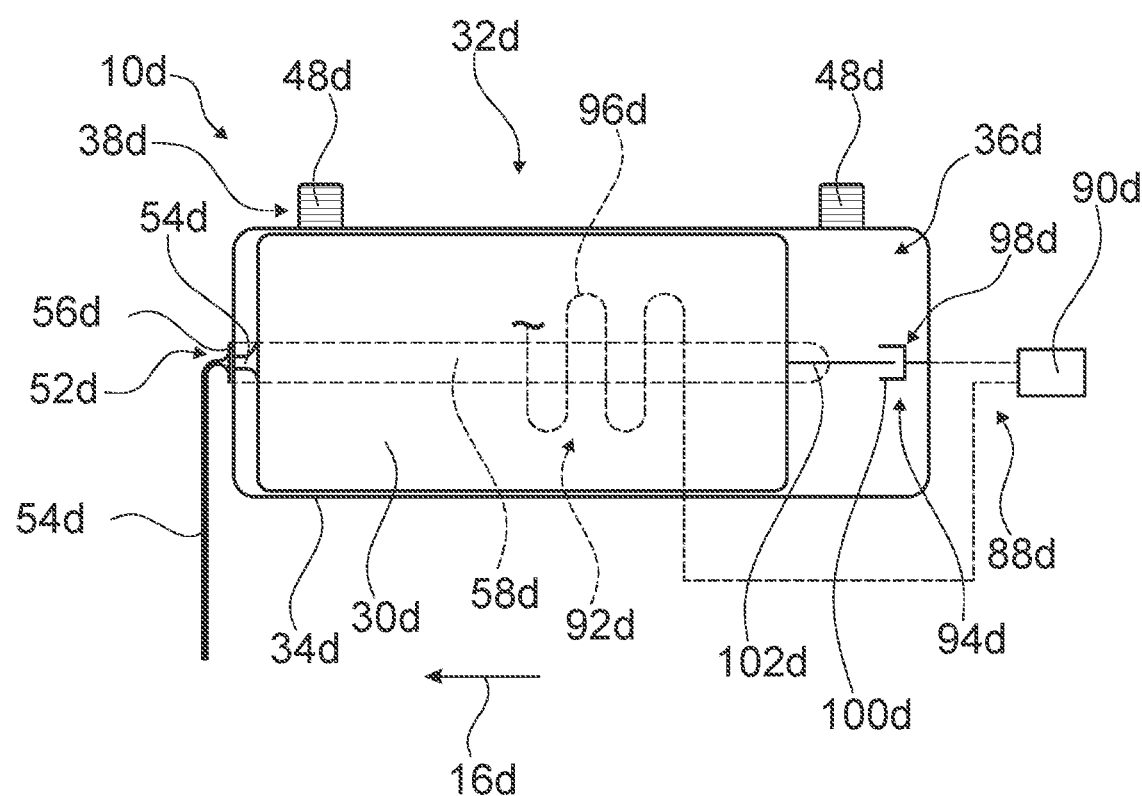

It is shown in:

FIG. 1 a life vest device according to the invention and an aircraft seat in a schematic perspective view of a first embodiment of the invention, FIG. 2 the life vest device according to the invention in a schematic perspective view of the first embodiment of the invention, FIG. 3 the life vest device according to the invention in a schematic top view of the first embodiment of the invention, FIG. 4 the life vest device according to the invention in a mounted and non-actuated state and the aircraft seat in a schematic side view of the first embodiment of the invention, FIG. 5 the life vest device according to the invention in a mounted and opened state and the aircraft seat during an actuation in a schematic side view of the first embodiment of the invention, FIG. 6 the life vest device according to the invention in the mounted and opened state and the aircraft seat in a schematic side view of the first embodiment of the invention, FIG. 7 a method for a production of the life vest device according to the invention in a schematic view of the first embodiment of the invention, FIG. 8 a life vest device according to the invention in a non-actuated state in a schematic top view of a second embodiment of the invention, FIG. 9 the life vest device according to the invention in an opened state in a schematic front view of the second embodiment of the invention, FIG. 10 a life vest device according to the invention in a non-actuated state in a schematic side view of a third embodiment of the invention, FIG. 11 the life vest device according to the invention in an opened state during an actuation in a schematic side view of the third embodiment of the invention and FIG. 12 a life vest device according to the invention in a non-actuated state in a schematic sectional side view of a fourth embodiment of the invention.

DESCRIPTION OF THE ILLUSTRATIVE EMBODIMENTS

FIG. 1 shows a life vest device 10*a* and an aircraft seat 12*a* in a schematic perspective view. The life vest device 10*a* and the aircraft seat 12*a* are designed as a system 14*a*. The life vest device 10*a* is configured for a fixation on the aircraft seat 12*a*. The life vest device 10*a* is fixable on the aircraft seat 12*a* in a stationary manner. The life vest device 10*a* is fixated on the aircraft seat 12*a* in a stationary manner. The life vest device 10*a* is configured to be attached permanently to the aircraft seat 12*a*. The life vest device 10*a* is provided to be retrofitted to the aircraft seat 12*a*. The aircraft seat 12*a* is mounted in an aircraft cabin of an aircraft (not shown). The aircraft seat 12*a* is embodied as an economy-class seat. The aircraft seat 12*a* comprises a seating direction 16*a*. The aircraft seat 12*a* comprises a seat bottom unit 18*a*. The aircraft seat 12*a* comprises a backrest unit 20*a*. The aircraft seat 12*a* is free of a leg rest. The aircraft seat 12*a* comprises a mounting unit 22*a*. The seat bottom unit 18*a* and the backrest unit 20*a* are arranged at the mounting unit 22*a*. The mounting unit 22*a* features two front seat legs 24*a* and two rear seat legs 26*a*. The aircraft cabin comprises a cabin floor 28*a*, on which the aircraft seat 12*a* is mounted by means of the mounting unit 22*a*. In a mounted state, the life vest device 10*a* is arranged between the cabin floor 28*a* and the seat bottom unit 18*a*.

FIG. 2 shows the life vest device 10*a* in a schematic perspective view. Further, FIG. 3 shows the life vest device 10*a* in a schematic top view. Moreover, FIG. 4 shows the life vest device 10*a* in the mounted state and the aircraft seat 12*a* in a schematic side view. In FIG. 4, the back rest unit 20*a* of the aircraft seat 12*a* is not shown. The life vest device 10*a* is shown in a non-actuated state in FIGS. 1 to 4. The life vest device 10*a* comprises a life vest unit 30*a*. The life vest unit 30*a* is embodied as a life jacket. The life vest unit 30*a* is provided for an emergency situation, in which there is a danger of drowning. The life vest unit 30*a* is configured to be worn by a person, in particular by a passenger or by a crew member, in the emergency situation. The life vest unit 30*a* is embodied to be inflatable. The life vest unit 30*a* features at least one gas cartridge (not shown), which is configured for inflating the life vest unit 30*a* upon activation.

The life vest device 10*a* comprises a packaging unit 32*a* for a sealed accommodation of the life vest unit 30*a*. The packaging unit 32*a* has a cylindrical basic shape. The packaging unit 32*a* cannot be opened nondestructively. The packaging unit 32*a* features a packaging element 34*a*. In the non-actuated state, the life vest unit 30*a* is arranged inside the packaging unit 32*a*. The packaging unit 32*a* is sealed in the non-actuated state. The packaging element 34*a* is configured to be airtight. In the non-actuated state, the life vest unit 30*a* is packed airtightly inside the packaging unit 32*a*. In the non-actuated state, the life vest unit 30*a* is packed airtightly inside the packaging element 34*a*. The packaging unit 32*a* comprises a storage chamber 36*a* for an accommodation of the life vest unit 30*a*. The life vest unit 30*a* is, in the mounted state, arranged in the storage chamber 36*a*. The packaging element 34*a* encompasses the storage chamber 36*a*. The packaging element 34*a* is configured for housing the life vest unit 30*a* inside the storage chamber 36*a*. The packaging element 34*a* is embodied as a flexible bag. The packaging element 34*a* is made of a plastic material, which is embodied as a foil. The packaging element 34*a* is embodied transparent. A material thickness of the packaging element 34*a* is at least substantially constant. The material thickness of the packaging element 34*a* is at least 0.5 mm. The material thickness of the packaging element 34*a* is at most 1 mm. The packaging unit 32*a* is sealed in the non-actuated state.

The packaging unit 32*a* comprises a fixation unit 38*a* for a fixation on the aircraft seat 12*a*. The fixation unit 38*a* is configured for a fixation of the life vest device 30*a* on the aircraft seat 12*a*. The fixation unit 38*a* is configured for a fixation of the life vest device 30*a* at the mounting unit 22*a* of the aircraft seat 12*a*. The life vest device 30*a* is arranged hanging underneath the seat bottom unit 18*a* by means of the fixation unit 38*a*. The fixation unit 38*a* is at least configured to prevent a substantial movement of the packaging unit 32*a* in the seating direction 16*a*. The fixation unit 38*a* comprises four fixation elements 40*a* that are arranged on the packaging unit 32*a* and are configured for a stationary fixation of the packaging unit 32*a* on the aircraft seat 12*a*. The fixation elements 40*a* are welded on the packaging unit 32*a*. The fixation elements 40*a* are welded on the packaging element 34*a*. Alternatively, it is conceivable that the fixation elements 40*a* are glued or stitched on the packaging element 34*a*. The fixation unit 38*a* features a bracket element 42*a*, which is connected to the mounting unit 22*a* (cf. FIG. 4). The mounting unit 22*a* features a front transverse tube 44*a* and a rear transverse tube 46*a*. The bracket element 42*a* is connected to the front transverse tube 44*a* and to the rear transverse tube 46*a*. The bracket element 42*a* is connected with the front transverse tube 44*a* and the rear transverse tube 46*a* by a positive-fit connection and by a negative-fit connection, for instance by means of a rivet. It is conceivable that the bracket element 42*a* is embodied as a part of the mounting unit 22*a* or as part of an electrical unit (not shown) of the aircraft seat 12*a*, for instance an in-flight-entertainment housing section, in particular an in-flight entertainment shroud, or a cable tray. The fixation unit 38*a* comprises two connection elements 48*a* (FIG. 4). Alternatively, it is conceivable that the fixation unit 38*a* comprises a different number of connection elements 48*a*, for instance four. The connection elements 48*a* are configured to tie the fixation element 40*a* to the aircraft seat 12*a*. The connection elements 48*a* are configured to tie the fixation element 40*a* to the bracket element 42*a*. The connection elements 48*a* are embodied as a sling. The connection elements 48*a* are implemented as a double sided hook and loop fastener, for instance a Velcro® strip. Alternatively, it is conceivable that the connection elements 48a each are embodied as a cable tie or as a rope. The fixation elements 40a each feature a loop 50a. The loop 50a is configured to hold respectively one connection element 48a on the packaging unit 32a. Additionally or alternatively, it is conceivable that the connection elements 48a each are embodied integrally with the fixation elements 40a. It is conceivable that the connection elements 48a are directly fixed to the front transverse tube 44a and/or to the rear transverse tube 46a and/or to the in-flight-entertainment housing section.

The life vest device 10a comprises an opening unit 52a for an opening of the packaging unit 32a (FIGS. 2 and 3). The opening unit 52a is functionally connected with the life vest unit 30a. The opening unit 52a is in the non-actuated state configured to seal the packaging unit 32a in an at least section-wise manner. The opening unit 52a is configured, upon actuation, to irreversibly destroy a sealing of the packaging unit 32a. The life vest unit 30a can be retrieved from the packaging unit 32a by means of the opening unit 52a. The opening unit 52a is at least partially embodied as an opening tab that is, in an at least section-wise manner, connected with the packaging unit 32a and with the life vest unit 30a by substance-to-substance bond. The opening tab is welded on the packaging unit 32a and on the life vest unit 30a. Alternatively or additionally, it is conceivable that the opening tab is glued or stitched on the packaging unit 32a and/or on the life vest unit 30a. The opening unit 52a encompasses the packaging unit 32a in the non-actuated state in an at least section-wise U-shaped, in particular horseshoe-like manner.

The opening unit 52a features a pull strap 54a. The pull strap 54a is configured for the actuation of the opening unit 52a in a direction that is at least substantially parallel to the seating direction 16a. The pull strap 54a is made of a plastic material, which is implemented as a foil. The opening unit 52a is not configured for an activation of the life vest unit 30a for an inflation of the life vest unit 30a. The life vest unit 30a features at least one activation element (not shown) which is configured for inflating the life vest unit 30a.

The at least one activation element is embodied different than the opening unit 52a. The at least one activation element is embodied differently than the pull strap 54a. The opening unit 52a is coupled with the life vest unit 30a. For a retrieval of the life vest unit 30a from the packaging unit 32a, the opening unit 52a is connected in an at least substantially tear-proof manner with the life vest unit 30a. The opening unit 52a and the life vest unit 30a are embodied integrally. The pull strap 54a and the life vest unit 30a are embodied integrally. The pull strap 54a is connected with the life vest unit 30a by a substance-to-substance bond. In the non-actuated state, for the purpose of establishing a connection to the life vest unit 30a, the opening unit 52a extends in an at least section-wise manner in an inner space of the packaging unit 32a (FIG. 3). The inner space of the packaging unit 32a is embodied as the storage chamber 36a.

The opening unit 52a is configured to overlap the packaging unit 32a at least partially. The opening unit 52a features two opening strips 56a, 58a. Alternatively, it is conceivable that the opening unit 52a features a different number of opening strips, for instance one, three or four. The two opening strips 56a, 58a are of a similar type. The opening strips 56a, 58a have a same length. In the non-actuated state, the two opening strips 56a, 58a are arranged mirror-symmetrically to each other, relating to the pull strap 54a. The opening strips 56a, 58a are configured to overlap the packaging element 34a at least partially. In the non-actuated state, the opening strips 56a, 58a are arranged on the packaging element 34a, in particular on an outer surface of the packaging element 34a. The opening strips 56a, 58a are connected with the pull strap 54a. The opening strips 56a, 58a are connected with the pull strap 54a by substance-to-substance bond. The opening strips 56a, 58a and the pull strap 54a are embodied integrally. The opening strips 56a, 58a are made of a plastic material, which is implemented as a foil. The opening strips 56a, 58a and the pull strap 54a are made of a same material. A material thickness of the opening strips 56a, 58a and the pull strap 54a is at least substantially constant. The material thickness of the opening strips 56a, 58a and the pull strap 54a is at least 0.2 mm. The material thickness of the opening strips 56a, 58a and the pull strap 54a is at most 1 mm. The opening strips 56a, 58a are functionally connected with the packaging element 34a. The opening strips 56a, 58a are configured for section-wise ripping the packaging element 34a open along two elongate sections 60a, 62a. The elongate sections 60a, 62a have a maximum extent of at least 70% of a maximum extent of the life vest unit 30a.

The opening unit 52a is actuatable for a retrieval of the life vest unit 30a from the packaging unit 32a at least substantially simultaneously with the opening of the packaging unit 32a. The packaging unit 32a is configured to be partially torn by an actuation of the opening unit 52a, t. A connection of the opening unit 52a with the life vest unit 30a has a higher tensile-strength value than a connection of the opening unit 52a with the packaging unit 32a. A tensile-strength value of the connection of the opening unit 52a with the life vest unit 30a is by at least 20% higher than a tensile-strength value of the connection of the opening unit 52a with the packaging unit 32a. The connection of the opening unit 52a with the packaging unit 32a is configured to break before a connection of the opening unit 52a with the life vest unit 30a on the actuation of the opening unit 52a.

FIG. 5 shows the life vest device 10a in a mounted and opened state during the actuation in a schematic side view. Further, FIG. 5 shows the aircraft seat 12a in the schematic side view. By actuation, a person, in particular a passenger, sitting on the aircraft seat 12a pulls the pull strap 54a. As a result of the actuation, a tensile force 64a is applied to the opening unit 52a. The tensile force 64a which is applied to the opening unit 52a and which is necessary to open the packaging unit 32a is at least 100 N. The tensile force 64a does not need to be applied parallel to a longitudinal extension of the elongate sections 62a, 64a mandatorily. The tensile force 64a is applicable at an angle up to 45 degrees upwards, relative to a longitudinal extension of the elongate sections 62a, 64a. In principle, it is conceivable that the life vest device 10a is arranged underneath an aircraft seat 12a, in front of the aircraft seat 12a, wherein the life vest device 10a is rotated by 180 degrees in a horizontal plane in comparison to FIGS. 1 and 4. The life vest unit 10a could then be retrieved by a passenger from the aircraft seat 12a in front of the aircraft seat 12a in a direction opposite to the seating direction 16a.

By actuation, the opening strips 56a, 58a each are configured for ripping the packaging element 34a open on at least one spot. By actuation of the opening unit 52a, the opening unit 52a is configured to tear the packaging unit 32a open along the connection of the opening unit 52a with the packaging unit 32a. By actuation of the opening unit 52a, the opening strips 56a, 58a are configured to tear the packaging element 34a open along the connection of the opening unit 52a with the packaging unit 32a. By actuation of the opening unit 52a, the opening unit 52a is configured to tear the packaging unit 32a open along the elongate sections 60a, 62a. The sealed accommodation of the life vest unit 30a is opened upon actuation, in particular opened toward the aircraft cabin. Subsequently to the actuation of the opening unit 52a, the packaging unit 32a comprises a tear 66a.

FIG. 6 shows the life vest device 10a in the mounted and opened state in a schematic side view. Moreover, FIG. 6 shows the aircraft seat 12a in the schematic side view. The tear 66a is configured to separate the packaging unit 32a and the opening unit 52a from each other. The tear 66a is provided for a retrieval of the life vest unit 30a out of the storage chamber 36a. A resealing of the packaging unit 32a after the actuation of the opening unit 52a is impossible to effect by hand, in particular without a tool.

The life vest device 10a comprises a marking unit 68a, which is configured to indicate the opened state of the packaging unit 32a. The life vest device 10a is unsealed in the opened state. The marking unit 68a is configured to visually indicate a difference between the non-actuated state, in particular a sealed state, of the life vest device 10a and the opened state. The opening unit 52a is partially embodied as the marking unit 68a. The marking unit 68a is configured at least partially as a tear-off section 70a of the packaging unit 32a, wherein the opening unit 52a is configured, subsequent to actuation, to separate the tear-off section 70a from a remaining portion of the packaging unit 32a to indicate the opened state of the packaging unit 32a. The tear-off section 70a is embodied as a part of the packaging element 34a. By actuation of the opening unit 52a, the tear-off section 70a is implemented to be taken out of the packaging element 34a. The tear-off section 70a is connected to the opening strips 56a, 58a subsequently to the actuation of the opening unit 52a. The tear-off section 70a has at least substantially a same surface area as the opening strips 56a, 58a in a torn-off area, where the tear-off section 70a and the opening strips 56a, 58a each are arranged overlapping. By actuation of the opening unit 52a the opening unit 52a is separated from the packaging unit 32a. By actuation of the opening unit 52a the packaging element 34a is at least partially divided, in particular split. In the opened state, the packaging element 34a contacts the cabin floor 28a at least partially, in particular due to gravity.

FIG. 7 shows a method 72a for a production of the life vest device 10a in a schematic view. The method 72a comprises four method steps 74a, 76a, 78a, 80a. In a first method step 74a of the method 72a, the life vest unit 30a is connected with the opening unit 52a. In a second method step 76a of the method 72a, the life vest unit 30a is inserted into the packaging unit 32a, wherein the packaging element 34a is opened. In a third method step 78a of the method 72a, the opening unit 52a is at least partially arranged on the packaging unit 32a, wherein the opening strips 56a, 58a are welded on the packaging element 34a. In a fourth method step 80a of the method 72a, the life vest device 10a is zero-defect proofed. It is conceivable that the method 72a may also contain intermediate method steps and/or further method steps which are not part of the present invention.

FIGS. 8 to 12 show three further embodiments of the invention. The following description and the figures are essentially restricted to the differences between the exemplary embodiments, wherein regarding equally denominated components, in particular regarding components with the same reference numeral, the figures and/or description from the other exemplary embodiments, in particular of FIGS. 1 to 7 may be considered.

For distinguishing the exemplary embodiments, the letter a has been added to the reference numerals of the exemplary embodiment of FIGS. 1 to 7, while, in the exemplary embodiments of FIGS. 8 to 12, the letter a has been replaced by the letters b to d.

FIG. 8 shows a life vest device 10b in a non-actuated state in a schematic top view in a second embodiment of the invention. Moreover, FIG. 9 shows the life vest device 10b in an opened state in a schematic front view. The life vest device 10b is configured for a fixation on an aircraft seat (not shown). The aircraft seat has a seating direction 16b. The life vest device 10b comprises a life vest unit 30b. The life vest device 10b comprises a packaging unit 32b for a sealed accommodation of the life vest unit 30b. The packaging unit 32b has a cylindrical basic shape. The packaging unit 32b features a packaging element 34b. The packaging unit 32b comprises a storage chamber 36b for an accommodation of the life vest unit 30b. The packaging unit 32b comprises a fixation unit 38b for a fixation on the aircraft seat. The fixation unit 38b comprises four fixation elements 40b that are arranged on the packaging unit 32b and are configured for a stationary fixation of the packaging unit 32b on the aircraft seat. The fixation elements 40b are glued on the packaging element 34b. The fixation elements 40b each feature a loop 50b. The life vest device 10b comprises an opening unit 52b for an opening of the packaging unit 32b. The opening unit 52b is at least partially embodied as an opening tab that is, in an at least section-wise manner, connected with the packaging unit 32b and with the life vest unit 30b by substance-to-substance bond. The opening tab is glued on the packaging unit 32b and on the life vest unit 30b. The opening unit 52b encompasses the packaging unit 32b in the non-actuated state in an at least section-wise U-shaped, in particular horseshoe-like manner. The opening unit 52b is functionally connected with the life vest unit 30b. The opening unit 52b features a pull strap 54b. The opening unit 52b features two opening strips 56b, 58b.

In the non-actuated state, the pull strap 54b is arranged at an edge 82b of the packaging unit 32b. The opening strips 56b, 58b have different lengths. The opening strip 56b has a length that is at least twice the length of the opening strip 58b. The opening strips 56b, 58b are configured for section-wise ripping the packaging element 34b open along two elongate sections 60b, 62b. The elongate sections 60b, 62b together have a maximum extent of at least 120% of a maximum extent of the life vest unit 30b.

Subsequently to an actuation of the opening unit 52b, the packaging unit 32b comprises a tear 66b (FIG. 9). The life vest device 10b comprises a marking unit 68b, which is configured to indicate the opened state of the packaging unit 32b. The marking unit 68b is configured at least partially as a tear-off section 70b of the packaging unit 32b, wherein the opening unit 52b is configured, subsequent to actuation, to separate the tear-off section 70b from a remaining portion of the packaging unit 32b to indicate the opened state of the packaging unit 32b.

FIG. 10 shows a life vest device 10c in a non-actuated state in a schematic side view in a third embodiment of the invention. Moreover, FIG. 11 shows the life vest device 10c in an opened state during the actuation in a schematic side view. The life vest device 10c is configured for a fixation on an aircraft seat (not shown). The aircraft seat comprises a seating direction 16c. The life vest device 10c comprises a life vest unit 30c. The life vest device 10c comprises a packaging unit 32c for a sealed accommodation of the life vest unit 30c. The packaging unit 32c features a packaging element 34*c*. The packaging unit 32*c* comprises a storage chamber 36*c* for an accommodation of the life vest unit 30*c*.

The packaging unit 32*c* comprises a first fixation unit 38*c* for a fixation on the aircraft seat. The first fixation unit 38*c* comprises one fixation element 104*c* that is arranged on the packaging unit 32*c* and is configured for a stationary fixation of the packaging unit 32*c* on the aircraft seat. The first fixation unit 38*c* comprises a connection element 106*c*. The connection element 106*c* is embodied integrally with the fixation element 104*c*. The connection element 106*c* of the first fixation unit 38*c* is embodied as a sling. The fixation element 104*c* of the first fixation unit 38*c* is welded on the packaging element 34*c*. The connection element 106*c* of the first fixation unit 38*c* is directly fixed to a front transverse tube of a mounting unit (not shown in FIGS. 10 and 11) of the aircraft seat. The packaging unit 32*c* comprises a second fixation unit 108*c* for a fixation on the aircraft seat. The second fixation unit 108*c* comprises two fixation elements 110*c* that are arranged on the packaging unit 32*c* and are configured for a stationary fixation of the packaging unit 32*c* on the aircraft seat. The fixation elements 110*c* of the second fixation unit 108*c* each are stitched on the packaging element 34*c*. The second fixation unit 108*c* comprises two connection elements 112*c*. The connection elements 112*c* of the second fixation unit 108*c* each are embodied integrally with one of the fixation elements 110*c*. If connected with each other, the connection elements 112*c* of the second fixation unit 108*c* are embodied as a sling. The connection elements 112*c* of the second fixation unit 108*c* each are implemented as a double-sided hook and loop fastener.

The life vest device 10*c* comprises an opening unit 52*c* for an opening of the packaging unit 32*c*. The opening unit 52*c* is functionally connected with the life vest unit 30*c*. The opening unit 52*c* features a pull strap 54*c*. The opening unit 52*c* features an opening strip 56*c*.

The packaging unit 32*c* has an ashlar-formed basic shape. The opening unit 52*c* encompasses the packaging unit 32*c* in the non-actuated state at least section-wise L-shaped. Alternatively it is conceivable that the opening unit 52*c* encompasses the packaging unit 32*c* in the non-actuated state at least section-wise O-shaped or rectangular-shaped. In the non-actuated state, the opening unit 52*c* is arranged for the most part at an underside 84*c* of the packaging unit 32*c*. As a result, in the opened state, the packaging unit 32*c* is open at the underside 84*c*.

In the non-actuated state, the opening strip 56*c* is arranged for the most part at the underside 84*c* of the packaging unit. In the non-actuated state, the pull strap 54*c* is arranged partially at the underside 84*c* of the packaging unit 32*c*. The pull strap 54*c* is spot-welded on the opening strip 56*c*. In the non-actuated state, the opening unit 52*c* features three welding spots 86*c*, which connect the pull strap 54*c* with the opening strip 56*c*. The welding spots 86*c* have identical characteristics. The welding spots 86*c* are spaced apart from each other by at least 2 cm. The welding spots 86*c* are configured for an advantageously space-saving arrangement of the pull strap 54*c* in the non-actuated state.

The opening strip 56*c* can have a transverse extension which is up to a maximum transverse extension of the packaging unit 32*c* at the underside 84*c*. It is conceivable that the packaging element 34*c* has a cut-out at the underside 84*c* of the packaging unit 32*c*, which has substantially a same size as an area of the underside 84*c* of the packaging unit 32. In the non-actuated state, it is conceivable that the cut-out is completely covered by the opening strip 56*c*.

A connection of the pull strap 54*c* with the opening strip 56*c* has a lower tensile-strength value than a connection of the opening strip 56*c* with the packaging unit 32*c*. The tensile-strength value of the connection of the pull strap 54*c* with the opening strip 56*c* is by at least 20% lower than a tensile strength-value of the connection of the opening strip 56*c* with the packaging unit 32*c*. The pull strap 54*c* has a length that is at least 120% of a length of the opening strip 56*c*. The opening strip 56*c* is configured for section-wise ripping the packaging element 34*c* open along an elongate section 60*c*. The elongate section 60*c* comprises a maximum extent of at least a maximum extent of the life vest unit 30*c*.

The opening strip 56*c* is configured to open the underside 84*c* of the packaging unit 32*c* for a retrieval of the life vest unit 30*c*. By an actuation of the opening unit 52*c*, a tensile force 64*c* is applied to the opening unit 52*c*. The welding spots 86*c* are configured to break subsequently to the actuation of the opening unit 52*c*. As a result, during the actuation, the opening strip 56*c* is configured to get gradually turned over in a direction that is at least substantially parallel to the seating direction 16*c*. The packaging unit 32*c* is configured to be gradually opened by the opening unit 52*c* from a rear side in the seating direction 16*c* to a front (FIG. 11).

Subsequently to the actuation of the opening unit 52*c*, the packaging unit 32*c* comprises a tear 66*c* (FIG. 11). The life vest device 10*c* comprises a marking unit 68*c*, which is configured to indicate the opened state of the packaging unit 32*c*. The marking unit 68*c* is configured at least partially as a tear-off section 70*c* of the packaging unit 32*c*, wherein the opening unit 52*c* is configured, subsequent to actuation, to partially separate the tear-off section 70*c* from a remaining portion of the packaging unit 32*c* to indicate the opened state of the packaging unit 32*c*.

FIG. 12 shows a life vest device 10*d* in a non-actuated state in a schematic sectional side view in a fourth embodiment of the invention. The life vest device 10*d* is configured for a fixation on an aircraft seat (not shown). The aircraft seat has a seating direction 16*d*. The life vest device 10*d* comprises a life vest unit 30*d*. The life vest unit 30*d* does not feature a protective cover which is configured to seal the life vest unit 30*d* separately. The life vest device 10*d* comprises a packaging unit 32*d* for a sealed accommodation of the life vest unit 30*d*. The packaging unit 32*d* substantially corresponds to the packaging unit 32*a* of the first embodiment of the invention shown in FIGS. 1 to 6. The packaging unit 32*d* has a cylindrical basic shape. The packaging unit 32*d* features a packaging element 34*d*. The packaging unit 32*d* comprises a storage chamber 36*d* for an accommodation of the life vest unit 30*d*. The packaging unit 32*d* comprises a fixation unit 38*d* for a fixation on the aircraft seat. The fixation unit 38*d* comprises four fixation elements (not shown) that are arranged on the packaging unit 32*d* and are configured for a stationary fixation of the packaging unit 32*d* on the aircraft seat. The fixation unit 38*d* comprises four connection elements 48*d*, whereof two connection elements 48*d* are shown in FIG. 12. The connection elements 48*d* are configured to tie the fixation elements to the aircraft seat. The life vest device 10*d* comprises an opening unit 52*d* for an opening of the packaging unit 32*d*. The opening unit 52*d* substantially corresponds to the opening unit 52*a* of the first embodiment of the invention shown in FIGS. 1 to 6. The opening unit 52*d* encompasses the packaging unit 32*d* in the non-actuated state at least section-wise in a U-shaped, in particular horseshoe-like, manner. The opening unit 52*d* is functionally connected with the life vest unit 30*d*. The opening unit 52*d* features a pull strap 54*d*. The opening unit 52*d* features two opening strips 56*d*, 58*d*. The opening unit 52*d* is at least partially embodied as an opening tab, which is connected with the packaging unit 32d and with the life vest unit 30d by a positive-fit connection. The opening tab is stitched on the packaging unit 32d and on the life vest unit 30d.

The life vest device 10d features a monitoring device 88d. The monitoring device 88d is at least configured to capture a change of two characteristic by at least one electric and/or electronic signal. The monitoring device 88d is at least configured to detect, via at least one electric and/or electronic signal, a manipulation of the packaging unit 32d and a removal of the life vest unit 30d out of the packaging unit 32d. The monitoring device 88d is at least configured to monitor the life vest device 10d with regard to conformity with the two characteristics during an operation of the aircraft. Alternatively, it is conceivable that the life vest device 10d comprises a different number of characteristics. The two characteristics each comprise two states with two state values.

A first characteristic is related to the packaging unit 32d. As a result of a manipulation of the packaging unit 32d, for instance an opening of the packaging element 34d and/or an actuation of the opening unit 52d, the first characteristic is changed. The first characteristic comprises a first state and a second state. The first state of the first characteristic is "packaging unit 32d sealed". The first state of the first characteristic has one state value that is embodied as "false". The second state of the first characteristic is "packaging unit 32d unsealed". The second state of the first characteristic has one state value that is embodied as "true". The first characteristic has one predetermined state value that is embodied as "false".

A second characteristic is related to the life vest unit 30d. As a result of a removal of the life vest unit 30d out of the packaging unit 32d, the second characteristic is changed. The second characteristic comprises a first state and a second state. The first state of the second characteristic is "life vest unit 30d present in the storage chamber 36d". The first state of the second characteristic has one state value that is embodied as "false". The second state of the second characteristic is "life vest unit 30d not present in the storage chamber 36d". The second state of the second characteristic has one state value that is embodied as "true". The second characteristic has one predetermined state value that is embodied as "false". As a result, a deviation from predetermined states, which correspond to at least one requirement of a certification regulation, can advantageously be detected.

The monitoring device 88d comprises a control and/or regulation unit 90d. The control and/or regulation unit 90d is configured to capture the at least one electric and/or electronic signal and to send at least one output signal to a checking system (not shown). The control and/or regulation unit 90d is configured to determine whether there is a change of one or both of the two characteristics. The checking system is configured for receiving the output signal for data interpretation and/or for presentation of a monitoring result. The monitoring result is embodied as an outcome of an automated safety check of the life vest device 10d. The monitoring device 88d comprises a first electric and/or electronic sensor unit 92d. The monitoring device 88d comprises a second electric and/or electronic sensor unit 94d.

The first electric and/or electronic sensor unit 92d is configured to determine a change of the first characteristic. The first electric and/or electronic sensor unit 92d is at least configured for a detection of a manipulation of the packaging unit 32d. The first electric and/or electronic sensor unit 92d comprises a detection element 96d. The detection element 96d is fixedly connected with the packaging element 34d. The detection element 96d is configured to create and/or to modify the at least one electric and/or electronic signal. The first electric and/or electronic sensor unit 92d is at least partly integrated in a material of the packaging element 34d. It is conceivable that the packaging element 34d is embodied as a smart textile. In the non-actuated state, the packaging unit 32d is embodied airtight. The detection element 96d is embodied as an electric wiring. The electric wiring is integrated in the material of the packaging element 34d. The electric wiring is embodied as one electric loop, which is placed in arcs. The electric wiring is configured to open an electric circuit, when at least one of the opening strips 56d, 58d is torn off the packaging unit 32d. The electric loop is configured to break if at least one of the opening strips 56d, 58d is torn off the packaging element 34d.

The second electric and/or electronic sensor unit 94d is configured to determine a change of the second characteristic. The second electric and/or electronic sensor unit 94d is at least configured for a detection of a presence of the life vest unit 30d inside the storage chamber 36d. The second electric and/or electronic sensor unit 94d comprises an electric coupling unit 98d. The electric coupling unit 98d is configured to open an electric circuit if the life vest unit 30d is moved out of the storage chamber 36d. Alternatively, it is conceivable that the electric coupling unit 98d is configured to close the electric circuit if the life vest unit 30d is moved out of the storage chamber 36d. The electric coupling unit 98d is configured to create and/or to modify the at least one electric and/or electronic signal. The electric coupling unit 98d is at least partly arranged inside the storage chamber 36d. The second electric and/or electronic sensor unit 94d is configured to be coupled with the life vest unit 30d. The electric coupling unit 98d features a connector element 100d. The connector element 100d is configured for a frictional connection and/or for a positive-fit connection. The connector element 100d is connected with the packaging element 34d. The electric coupling unit 98d features a corresponding connector element 102d. The corresponding connector element 102d is connected with the life vest unit 30d. The connector element 100d and the corresponding connector element 102d are configured for an electrical connection with each other. The connector element 100d and the corresponding connector element 102d are configured to get separated from each other if the life vest unit 30d is moved out of the storage chamber 36d. The connector element 100d and the corresponding connector element 102d are configured to open the electric circuit if the connector element 100d and the corresponding connector element 102d are separated from each other. Alternatively, it is conceivable that the connector element 100d and the corresponding connector element 102d are configured to close the electric circuit if the connector element 100d and the corresponding connector element 102d are separated from each other.

REFERENCE NUMERALS 10 life vest device
12 aircraft seat
14 system
16 seating direction
18 seat bottom unit
20 backrest unit
22 mounting unit
24 seat leg 26 seat leg
28 cabin floor
30 life vest unit
32 packaging unit
34 packaging element
36 storage chamber
38 fixation unit
40 fixation element
42 bracket element
44 transverse tube
46 transverse tube
48 connection element
50 loop
52 opening unit
54 pull strap
56 opening strip
58 opening strip
60 elongate section
62 elongate section
64 tensile force
66 tear
68 marking unit
70 tear-off section
72 method
74 method step
76 method step
78 method step
80 method step
82 edge
84 underside
86 welding spot
88 monitoring device
90 control and/or regulation unit
92 electric and/or electronic sensor unit
94 electric and/or electronic sensor unit
detection element
98 coupling unit
100 connector element
102 connector element
104 fixation element
106 connection element
108 fixation unit
110 fixation element
112 connection element

The invention claimed is:

1. A life vest device for a fixation on at least one aircraft seat, with a life vest unit, which is embodied as a life vest with a packaging unit for a sealed accommodation of the life vest unit and with an opening unit for an opening of the packaging unit, which features at least one pull strap, wherein the opening unit is functionally connected with the life vest unit and the packaging unit comprises at least one fixation unit for a fixation on an aircraft seat,
wherein for a retrieval of the life vest unit from the packaging unit, the opening unit is connected in an at least substantially tear-proof manner with the life vest unit, wherein the pull strap and the life vest are embodied integrally with each other.

2. The life vest device according to claim 1, wherein the opening unit is actuatable for a retrieval of the life vest unit from the packaging unit at least substantially simultaneously with the opening of the packaging unit.

3. The life vest device according to claim 1, wherein a connection of the opening unit with the life vest unit has a higher tensile-strength value than a connection of the opening unit with the packaging unit.

4. The life vest device according to claim 1, wherein the opening unit is configured to seal the packaging unit in an at least section-wise manner in a non-actuated state.

5. The life vest device according to claim 1, wherein, in a non-actuated state, for the purpose of establishing a connection to the life vest unit, the opening unit extends in an at least section-wise manner in an inner space of the packaging unit.

6. The life vest device according to claim 1, wherein the opening unit is embodied as at least one opening tab that is, in an at least section-wise manner, connected with the packaging unit and with the life vest unit by being welded on the packaging unit and with the life vest unit.

7. The life vest device according to claim 1, wherein the opening unit is configured, upon actuation, to irreversibly destroy a sealing of the packaging unit.

8. The life vest device according to claim 1, comprising at least one marking unit, which is configured to indicate an opened state of the packaging unit.

9. The life vest device according to claim 8, wherein the at least one marking unit is configured at least partially as a tear-off section of the packaging unit, wherein the opening unit is configured, subsequent to actuation, to separate the tear-off section from a remaining portion of the packaging unit to indicate an opened state of the packaging unit.

10. The life vest device according to claim 1, wherein the at least one fixation unit comprises at least one fixation element that is welded on the packaging unit, and is configured for a stationary fixation of the packaging unit, on the at least one aircraft seat.

11. The life vest device according to claim 1, comprising at least one monitoring device, which is at least configured to capture a change of at least one characteristic by at least one electric and/or electronic signal.

12. The life vest device according to claim 1, the life vest is an inflatable life jacket.

13. A system with at least one life vest device according to claim 1 and with at least one aircraft seat, wherein the at lc\ost onc life vest device is fixable and/or fixated on the at least one aircraft seat in a stationary manner.

14. A method for production of a life vest device according to claim 1, comprising:
connecting the life vest unit with the opening unit,
inserting the life vest unit into the packaging unit which is opened, and
arranging the opening unit on the packaging unit, and connecting an opening strip of the opening unit to the packaging unit by being welded, glued, or stitched on the packaging unit.

15. A life vest device for a fixation on at least one aircraft seat, with a life vest unit, which is embodied as a life vest with a packaging unit for a sealed accommodation of the life vest unit and with an opening unit for an opening of the packaging unit, which features at least one pull strap, wherein the opening unit is functionally connected with the life vest unit and the packaging unit comprises at least one fixation unit for a fixation on an aircraft seat,
wherein the opening unit is at least partially embodied as an opening tab that is, in an at least section-wise manner, connected with the packaging unit and with the life vest unit by being welded on the packaging unit and with the life vest unit,
wherein the packaging unit features a packaging element, the opening unit features opening strips, the opening strips are configured to at least partially overlap the packaging element, in a non-actuated state the opening strips are arranged on an outer surface of the packaging element, and the opening strips are connected with the at least one pull strap.

16. The life vest device according to claim 15, wherein the opening strips are configured for section-wise ripping the packaging element open along two elongate sections.

17. The life vest device according to claim 15, wherein the opening strips are arranged mirror-symmetrically to each other in relation to the pull strap.

18. The life vest device according to claim 15, wherein in the non-actuated state the opening strips and the at least one pull strap are connected by a substance-to-substance bond.

* * * * *